Mar. 20, 1923.

J. J. ABRAHAMS ET AL

CONVERTIBLE CHILD'S VEHICLE

Filed Feb. 17, 1922 — 4 sheets-sheet 1

Inventors
J. J. Abrahams.
G. K. Abrahams.

By
Lacey & Lacey, Attorneys

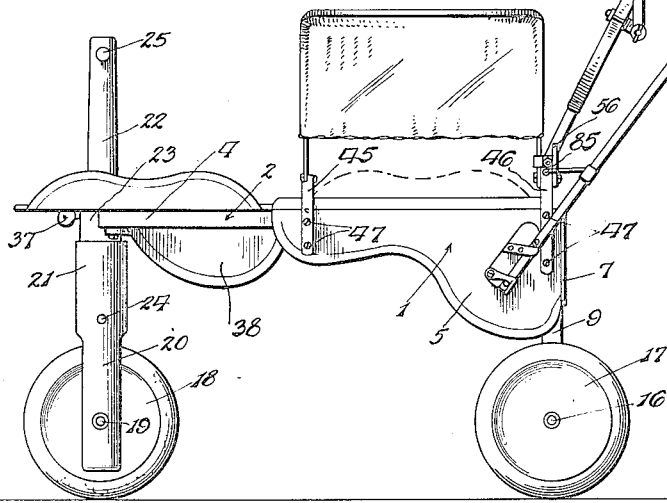
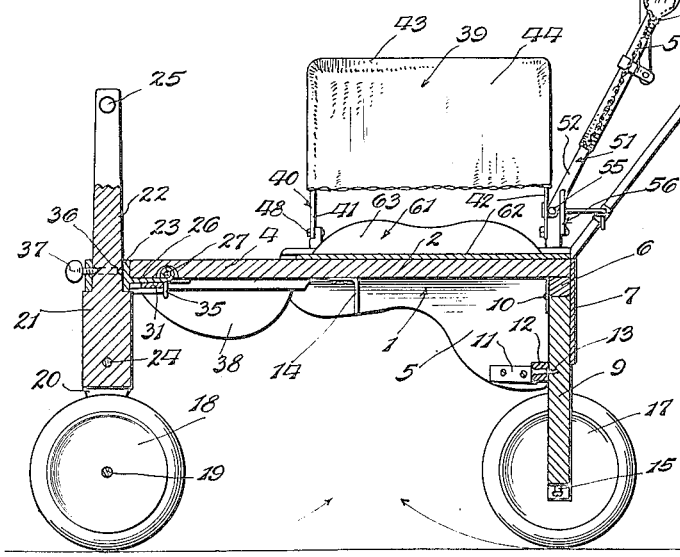

Mar. 20, 1923.  1,449,255
J. J. ABRAHAMS ET AL
CONVERTIBLE CHILD'S VEHICLE
Filed Feb. 17, 1922    4 sheets-sheet 3

Inventors
J. J. Abrahams.
G. K. Abrahams.

By Lacey & Lacey, Attorneys

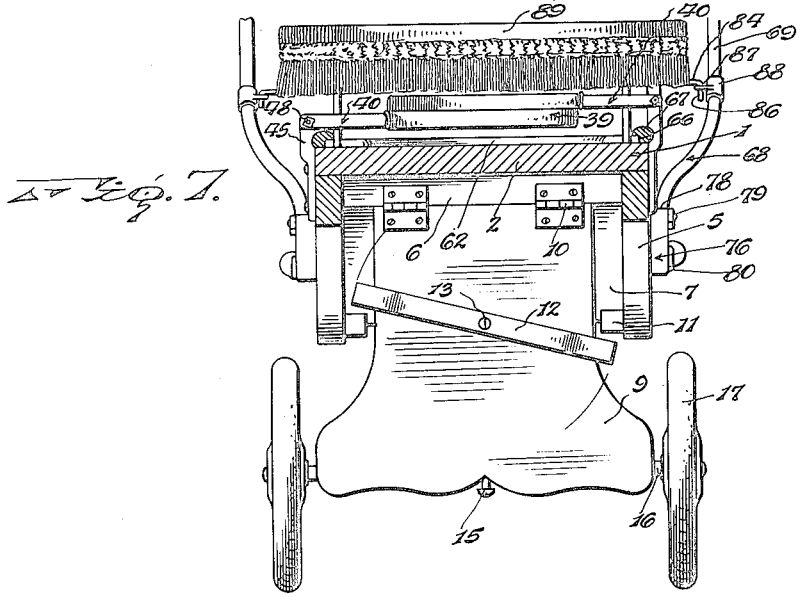

Patented Mar. 20, 1923.

1,449,255

UNITED STATES PATENT OFFICE.

JOHN J. ABRAHAMS AND GERDINA KROKKEE ABRAHAMS, OF GRAND RAPIDS, MICHIGAN.

CONVERTIBLE CHILD'S VEHICLE.

Application filed February 17, 1922. Serial No. 537,300.

*To all whom it may concern:*

Be it known that we, JOHN J. ABRAHAMS and GERDINA KROKKEE ABRAHAMS, citizens of the United States, residing at Grand Rapids, in the county of Kent and State of Michigan, have invented certain new and useful Improvements in Convertible Children's Vehicles, of which the following is a specification.

This invention relates to improvements in children's vehicles and more particularly to the convertible and foldable type.

One of the objects of the present invention is to provide a child's vehicle which may be readily and quickly converted for use as a gocart, reclining carriage, or "kiddy car" as may be desired.

Another object of the invention is to provide a vehicle of the general type mentioned above so constructed and having its parts so assembled that it may, as a whole, be folded to compact form so as to adapt it to be conveniently carried about as for example on a street car, in an automobile, or other conveyance, or to adapt it to be stored away in a small space.

Another object of the invention is to so construct and assemble the component parts of the structure that while the structure may be converted and folded as pointed out above, it will possess great strength and rigidity in any form to which it may be converted and will not be liable to have its parts disarranged.

Another object of the invention is to provide, for the vehicle, a handle and means connecting the handle with the body of the vehicle in a manner to provide for folding of the handle upon the body or its adjustment to an upright position for use, the means being so constructed that in either position of adjustment the handle will be rigidly supported, and particularly in the latter position, so that it will be practically as rigid with relation to the body as though fixedly secured thereto.

Another object of the invention is to provide, in a vehicle of the type mentioned, a back rest and means adapted to support the back rest at various angles of inclination so that the child may be seated in an upright position or may be permitted to recline, as desired, the back rest being furthermore so mounted as to provide for its being folded to occupy a position flatwise with relation to the bottom of the body.

Another object of the invention is to provide the body of the vehicle with sides which may be folded down in mutually overlapped relation in the collasped condition of the structure and which when elevated to position for use will be firmly supported in place.

A further object of the invention is to provide in connection with the fixed bottom of the structure, an extension section slidably supported in a manner to permit of its being slid forwardly when it is desired to support the child in a full reclining position, and to permit it to be slid rearwardly to such position as to permit the child's limbs to hang freely or to be rested upon foot rests which are associated with the standard for the front wheel of the vehicle, when the structure is being employed in substantially the manner of a "kiddy car".

Another object of the invention is to so construct and mount the canopy or top of the vehicle that when in use it may be supported rigidly in a suitably elevated position and when not in use may be compactly folded in flatwise relation to the bottom of the body.

In the accompanying drawings:

Figure 1 is a perspective view of the vehicle converted for use as a gocart and showing the bottom extension section slid forwardly to support the limbs of the child to permit a full reclining position;

Figure 2 is a side elevation of the structure arranged as shown in Figure 1;

Figure 3 is a vertical longitudinal sectional view through the structure so arranged;

Figure 7 is a vertical transverse sectional view through the vehicle partly collapsed and looking in a rearward direction;

Figure 8 is a perspective view illustrating the bearing member for the standard for the front wheel of the vehicle;

Figure 9 is a perspective view of one of the members for supporting the back rest in positions of angular adjustment; and Figure 10 is a detail side elevation illustrating a bracing means provided for the handle of the vehicle.

Figure 4:
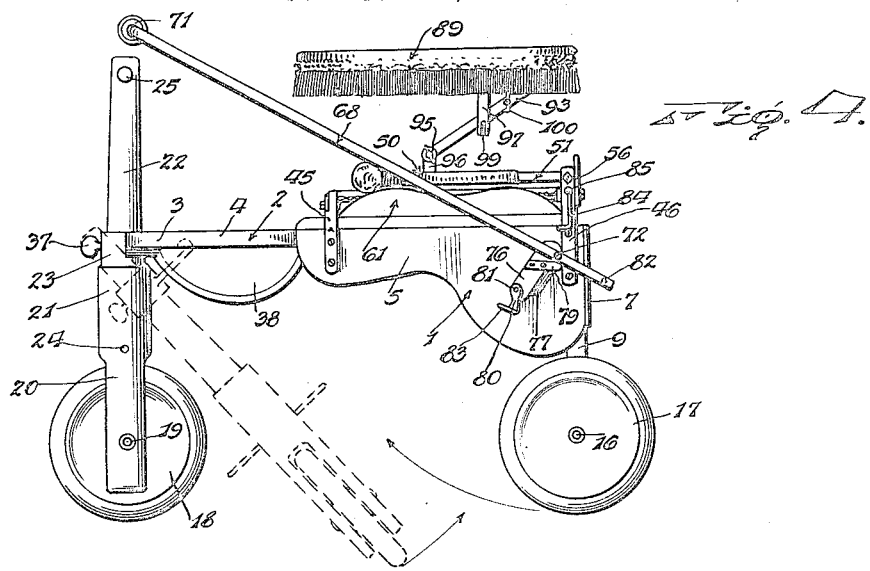
Figure 4 is a side elevation of the structure partly collapsed or folded, the front wheel and its supporting standard being shown in dotted lines in a partly folded condition and in full lines in supporting position.

The vehicle embodying the invention includes in its structure a body which is indicated in general by the numeral 1 and which comprises a bottom board 2 having a rectangular rear portion and cut away at its opposite sides at its front as indicated by the numeral 3 so as to provide a relatively narrow forward portion 4 at the opposite sides of which the child's limbs may depend when the structure is converted for use in a manner simulating the use of a "kiddy car" and when the child is seated in an upright position within the vehicle. Preferably the body 1 further comprises side members 5 which project downwardly in vertical planes from the opposite lateral edges of the rectangular rear portion of the bottom 2, a cleat 6 being secured to the under side of said portion of the bottom along the rear edge thereof and extending between the said depending sides 5. Also if desired a board 7 may be secured across the rear end of the body to extend between the rear ends of the sides 5 so as to conceal said cleat 6 and other parts which are associated therewith.

Figure 5:
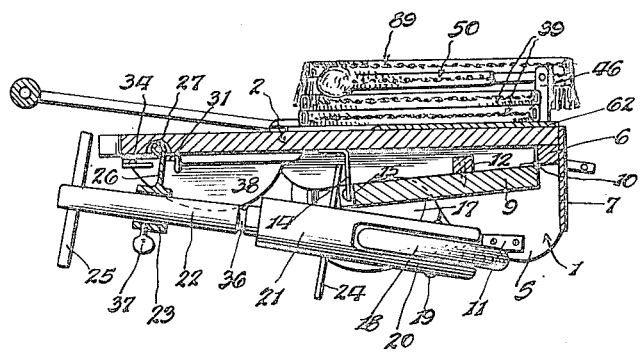
Figure 5 is a vertical longitudinal sectional view through the structure completely folded.

A bolster 9 is hinged at its upper edge as at 10 to the cleat 6 and is adapted to be swung upon its hinges to assume the vertical position shown for example in Figure 3 of the drawings in which position its upper edge will abut against the lower edge of the cleat 6 and its rear face will abut against the forward face of the board 7. Keeper blocks 11 are secured upon the inner faces of the depending sides 5 at a point below the hinges 10, and a locking bar 12 is swiveled midway between its ends as at 13 upon the forward face of the bolster 9 and is adapted to be swung to assume a position extending horizontally across the face of said bolster and engaging at its ends behind the keeper blocks 11. By this means the bolster may be rigidly secured in the upright position shown and described. However when the structure is to be collapsed the locking bar 12 may be swung upon its swivel to disengage its ends from the keeper blocks 11, and the bolster 9 may then be swung upwardly and forwardly about its hinges 10 to position beneath the rectangular rear portion of the bottom 2 of the body. The bolster may be retained in this position by providing a leaf spring latch 14 upon the under side of the bottom 2 of the body and providing a stud 15 upon the lower edge of the bolster for engagement with the said latch as shown in Figure 5 of the drawings. Spindles 16 are mounted in the opposite sides of the bolster 9 at its lower end and support ground wheels 17 which may be of any desired construction. It will now be evident that when the bolster is in the upright position shown for example in Figure 3, it may be firmly secured in such position and the ground wheels will be adapted to support the rear part of the structure for travel but when it is desired to collapse the structure the bolster may be released and folded beneath the bottom of the body in the manner explained and as shown in Figure 5.

The forward end of the body is adapted to be supported for travel by a single ground wheel indicated by the numeral 18 which is mounted upon a spindle 19 and within a yoke 20 at the lower end of a supporting standard 21. This standard is provided with a reduced upper portion indicated by the numeral 22 which is rotatably fitted through a collar 23 at the forward end of the portion 4 of the bottom of the body, and the said standard may be provided with a transverse foot bar 24 projecting at its ends beyond opposite sides of the standard in position for engagement by the feet of the child occupying the vehicle. Likewise the standard may be provided at its upper end with a transverse handle bar 25 which may be grasped by the child for the purpose of rotating the standard to steer the vehicle. As stated the standard is mounted at its reduced portion 22 rotatably within the collar 23, and this collar is preferably supported at the outer end of a plate or leaf 26 which is pivotally mounted at its rear end as at 27 within a frame plate 28 secured upon the under side of the forward portion 4 of the vehicle bottom. The frame plate 28 comprises spaced side members 29 and a connecting rear portion 30, and the plate or leaf 26 is adapted to assume a position lying between the side portions 29 and substantially in a plane with the said plate 28 when it is swung upon its pivot in an upward and forward direction. It is adapted to be retained in this position by means of a latch arm 31 pivoted at one end as at 32 upon the under side of the forward end of one of the spaced members 29 of the frame plate 28, the other end of the latch arm, indicated by the numeral 33, being engageable with a keeper lip 34 provided upon the corresponding portion of the other side member 29 of said frame plate. A finger piece 35 may be provided upon the latch arm to permit of ready manual movement of the same into and out of engagement with the keeper lip 34. Thus when the plate 26 is swung upon its pivot to assume the position shown for example in Figures 3 and 8 of the drawings, the latch arm 31 may be swung into engagement with the keeper lip 34, and the plate will thus be locked securely in its position of adjustment. In this position the standard 21 will be disposed vertically and it may be rotated within the collar 23, the standard being provided with a circumscribing groove 36 in its portion which seats within the collar, and a set screw 37 being threaded through one side of the collar 23 to project at its end into the said groove. By this means downward displacement of the standard within the collar is prevented although its rotative movement is not interfered with. However should it be desired to secure the standard against rotation, the set screw 37 may be tightened so as to bind in the bottom of the groove.

When the structure is to be collapsed the set screw 37 is loosened, the standard 21 is slid downwardly in the collar 23, complete separation being prevented by the handle bar 25 engaging the collar, the latch arm 31 is swung out of engagement with its keeper end clear of the plate 26, and the said plate is swung downwardly and rearwardly so as to dispose the standard 21 beneath the bottom of the body as shown in Figure 5 of the drawings, an intermediate position in such movement being illustrated in dotted lines in Figure 4. At the same time the standard is preferably rotated to such position that the ground wheel 18 at the lower end thereof will be disposed substantially flatwise to the bottom 2 of the body. Prior to adjusting the standard to this position, the bolster 9 will have been released and swung to position beneath the bottom 2, and thus the parts will underlie one another when the structure is completely folded, as shown clearly in Figure 5. If desired side members 38 may be secured to the under side of the forward portion 4 of the bottom 2 to depend as shown in Figures 2, 3, 4 and 5 of the drawings and thus afford a means for concealing or partly concealing from view the devices provided for mounting the standard 21. The sides 5 will serve a like purpose with regard to the bolster 9 and latch 14.

The foldable sides of the body 1 are indicated in general by the numeral 39 and each preferably comprises a frame 40 of general rectangular form, although it may assume some other shape and including spaced front and rear side members indicated respectively by the numerals 41 and 42 and a connecting member 43, a filler 44 of rattan, wicker, or other similar material being arranged within the frame to provide a supporting surface. In mounting the sides 39, front and rear standards 45 and 46 respectively are secured as at 47 upon the outer faces of the respective sides 5 of the vehicle body and project at their upper portions above the plane of the bottom 2. The spaced sides 41 and 42 are pivoted at their lower ends as at 48 to the standards 45 and 46 respectively, and the pivots for one of the sides 39 are located higher than the pivots for the other side so that the last mentioned side may be folded or swung downwardly to rest flat upon the upper surface of the bottom 2 and then the other side 39 may be similarly collapsed to position resting upon the first folded or collapsed side. In this manner the two sides 39 may be collapsed without interference one on the part of the other and will assume a flat and compact condition when so collapsed. In order that the sides 39 may be firmly braced in upright position, rests 49 are secured upon the uprights 46 and are so disposed as to provide for the engagement therein of the rear side members 42 of the frames 40.

The back rest of the vehicle is indicated in general by the numeral 50 and the said back rest preferably comprises a substantially rectangular frame 51 including spaced side members 52 and a connecting top member 53, a filler 54 similar to the fillers 44 for the sides 39 being arranged within this frame so as to provide a supporting surface. The back rest frame is mounted in place by being pivoted at the lower ends of its sides 52 as at 55 upon the rear standards 46 so that the back rest may be swung to assume an upright inclined position or may be swung downwardly and forwardly to overlie the folded or collapsed sides 39 as shown in Figure 5. When the back rest is in upright position it will be supported by rests 56 each comprising a plate or leaf 57 swiveled as at 58 upon the rear side of the respective upright 46 and provided in its upper end with spaced notches 59 and 60. The notches 59 of the rests 56 are of less depth than the notches 60. When it is desired to support the back rest in an upright position approximating the vertical, the rests 56 will be swung upwardly about their swivels 58 and the side members 52 of the frame of the back rest will be engaged in the notches 59 in the said rests 56 at points above their pivots 55. As these notches are relatively shallow, the frame of the back rest will not be permitted to swing rearwardly to a greatly inclined position, and there is no likelihood of disengagement of the parts from one another due to the more or less snug engagement of the side members 52 in the said notch 59. When it is desired to support the back rest at a more inclined position or in other words in position more nearly approaching the horizontal, so that the child may assume a full reclining position, the rests 56 are so adjusted about their pivots as to permit of the engagement of the side members 52 of the back rest frame in the deeper notches 60 of said rests.

When the back rest 50 is in the more upright position above described, it will be desirable to permit the child's limbs to depend at opposite sides of the forward portion 4 of the bottom 2 but when the back is adjusted to permit the child assuming a full reclining position it will be desirable to provide support for the limbs, and with this end in view the bottom 2 is provided with an extension section which is indicated in general by the numeral 61. This extension section 61 comprises a bottom board 62 which may be thinner than the bottom 2, if desired, and which is slidably disposed flat upon the upper surface of the said bottom 2. It further includes upstanding sides 63, and the said bottom board 62 is cut away or recessed at its forward end as at 64 so as to adapt it to encompass the standard 21 when the section 61 is slid forwardly to the position shown in Figures 1 and 2 of the drawings. In order that the section may be retained in place and firmly supported, the bottom board 62 is provided with projecting marginal portions 65 extending laterally beyond the planes of the upstanding sides 63 and engaging slidably in grooves or rabbets 66 formed in the opposing sides of cleats 67 which extend longitudinally of the opposite lateral edges of the bottom 2. It will now be evident that the section 61 may be slid rearwardly to clear the forward portion of the bottom 2 and permit the child's limbs to depend at opposite sides of said portion, or it may be slid forwardly to support the child's limbs in a reclining position. Likewise it will be evident that the upstanding sides 63 of said bottom section are so proportioned and arranged that they will not interfere with the folding or collapse of the sides 39 of the vehicle, and in fact when the sides are collapsed, the spaced members 41 and 42 of their frames will lie at the ends of the said sides 63 of the bottom section thus preventing any forward or rearward displacement of said section when the structure is collapsed.

Figure 6:
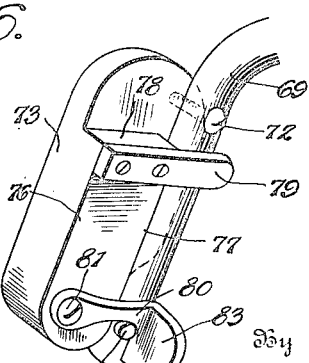
Figure 6 is a perspective view in detail illustrating the means provided for pivoting the handle of the vehicle and for maintaining it in positions of adjustment.

The handle which is provided for use in wheeling the vehicle about from place to place is indicated in general by the numeral 68 and the same comprises side members 69 and a connecting handle bar 70 which may be provided with a suitable hand grip 71. The side members 69 are pivotally mounted at their lower ends as at 72 upon blocks 73 secured upon the outer sides of the side members 5 of the vehicle body, and each of these blocks is provided with a boss 76 having a straight side 77 and a straight upper end 78, the pivot 72 for the respective side member 69 of the handle being located diagonally opposite the upper rear corner of said boss and in such spaced relation to the boss as to permit of the side member 69 being moved upon its pivot to the position shown for example in Figures 2 and 6 of the drawings in which position its portion below the pivot 72 will bear firmly against the straight rear side 77 of the boss 76, and the handle as a whole will be firmly supported in an upwardly and rearwardly inclined position as shown in Figures 2 and 3 of the drawings in which position it may be conveniently employed in wheeling the vehicle about, as stated. Preferably the boss 76 of each block 73 is provided with a rearwardly projecting finger 79 constituting a guiding and restraining means for the portion of the respective side members 69 below the pivot 72 as shown in Figure 6. In order to positively preclude any forward displacement of the handle when adjusted to the position stated, a latch 80 is pivoted as at 81 upon the boss of each block 73 and may be dropped to engagement over a stud 82 projecting laterally outwardly from the lower end portion of the respective side member 69 of the handle, the latch being provided with a finger piece 83 whereby it may be conveniently engaged and disengaged. When it is desired to collapse the structure, the handle 68 may be swung forwardly upon its pivots 72 after disengagement of the latches 80 from the studs 82, and until the side members 69 of said handle rest in engagement with the straight upper ends 78 of the boss 76. In order to further brace the handle 68, brace arms 84 are pivotally mounted at their ends as at 85 upon the rear standards 46 and are provided with hooked rear terminals 86 engageable in eyes 87 provided upon collars 88 fitted to the side members 69 of the handle, it being understood that these braces members are to be disengaged from the handle when the handle is to be collapsed.

The vehicle is completed by a top or canopy which is indicated in general by the numeral 89 and this top comprises a rectangular frame 90 including spaced side members 91. The top further includes a covering 92 of any suitable material arranged over the frame. For the purpose of supporting the frame, supporting arms 93 are pivotally connected at their upper ends as at 94 to the side members 91 of the frame 90 substantially at the rear corners of said frame, and the lower ends of these arms are pivotally supported upon clamping bolts 95 in turn supported by bracket members 96 fixed upon the opposite sides of the back rest 50 as best shown in Figure 1 of the drawings, it being understood that by tightening said bolts the arms may be clamped so as to be supported in upright or collapsed position either as desired. When the arms are upright or substantially upright the top will be supported substantially horizontally above the body of the vehicle, and when the clamping bolts are loosened the arms may be swung upon their pivots in a rearward direction, as the back rest is collapsed by being swung in a forward direction, so as to finally dispose the top 89 substantially flatwise in superposed relation to the collapsed back rest. In order to firmly brace the top 89 when in raised position for use, brace arms 97 are pivotally connected at their forward ends as at 98 to the side members 91 of the top frame 90 and are provided with notched rear ends 99 which are adapted to be seated in engagement with projecting studs 100 upon the arms 93, the engagement of the said ends of the brace arms with the studs serving to firmly support the top in raised position for use, and disengagement of the said ends of the brace arms from the studs permitting of collapse of the said top.

Having thus described the invention what is claimed as new is:

1. In a convertible child's vehicle, a body including a bottom and depending sides, a board extending across the rear end of the body between said sides, a bolster hingedly mounted beneath the rear end of the bottom and foldable to lie beneath the bottom and movable to position to lie against the said board, means for retaining said bolster in either of said positions of adjustment, and wheels supported by the bolster.

2. In a convertible child's vehicle, a body including a bottom having depending sides, a back board extending across the rear end of the body between the sides, a bolster hingedly connected with the under side of the bottom at the rear thereof, the bolster being movable to position to lie beneath the bottom and to upright position resting against said back board between said sides, wheels carried by the bolster, and means for retaining the bolster in the last mentioned position of adjustment.

3. In a convertible child's vehicle, a body including a bottom having depending sides, a back board extending across the rear end of the body between the sides, a bolster hingedly connected with the under side of the bottom at the rear thereof, the bolster being movable to position to lie beneath the bottom and to upright position resting against said back board between said sides, wheels carried by the bolster, and means for retaining the bolster in the last mentioned position of adjustment, the said means comprising a locking bar swiveled upon the bolster, and keeper members upon the said sides behind which the ends of the locking bar are engageable when the bar is rocked about its pivot.

4. In a convertible child's vehicle, a body including a bottom, and means supporting the forward portion of the body for travel comprising a bearing collar arranged upon the said bottom of the body, a standard rotatably mounted in said collar, a ground wheel carried by the standard, the standard having a circumscribing groove, and a set screw fitted through the collar and engaging at its end in said groove whereby to retain the standard within the collar for rotation, the set screw when tightened constituting means for preventing rotation of said standard.

5. In a convertible child's vehicle, a body comprising a bottom, and means supporting the body for travel including a member pivotally mounted upon the said bottom of the body, a bearing collar carried by the member, a standard rotatably and slidably fitted within said collar, a ground wheel carried by the standard, and means for locking the said member in a position to maintain the standard in upright position.

6. In a convertible child's vehicle, a body comprising a bottom, and means supporting the body for travel including a member pivotally mounted upon the said bottom of the body, a bearing collar carried by the member, a standard rotatably and slidably fitted within said collar, a ground wheel carried by the standard, and means for locking the said member in a position to maintain the standard in upright position, the said locking means comprising a keeper element, and a latch member pivotally mounted in position to be swung beneath the said collar supporting member and in engagement with the keeper.

7. In a convertible child's vehicle, a body, standards mounted at the opposite sides of the body, a back rest including side members pivoted upon the standards, and rests swiveled upon the standards and angularly adjustable with relation to the sides of the back rest and each having variously elevated portions against which the said sides of the back rest may be disposed.

8. In a convertible child's vehicle, a body, standards mounted at the opposite sides of the body, a back rest including side members pivoted upon the standards, and rests swiveled upon the standards and angularly adjustable with relation to the sides of the back rest and each having notches of different depths to accommodate and support the sides of the back rest.

9. In a convertible child's vehicle, a body including a bottom having its forward portion narrowed to permit of the child's limbs hanging at the opposite sides thereof, and an extension section slidably adjustably mounted upon the bottom and movable to inactive position to overlie the rear portion of the bottom and to active or supporting position overlying the narrowed forward portion of the bottom and constituting a rest for the child's limbs in a reclining position.

10. In a convertible child's vehicle, a body including a bottom having its forward portion narrowed to permit of the child's limbs hanging at the opposite sides thereof, and an extension section slidably adjustably mounted upon the bottom and movable to inactive position to overlie the rear portion of the bottom and to active or supporting position overlying the narrowed forward portion of the bottom and constituting a rest for the child's limbs in a reclining position, the bottom being provided at its opposite sides with grooved guide members, the said extension section being provided with means slidably seating in the grooves in the said guide members.

11. In a convertible child's vehicle, a body supported for travel, members mounted upon the opposite sides of the body and each having a boss provided with relatively angularly disposed abutment portions, and a handle for propelling the vehicle including side members pivotally connected to the last mentioned members and having their portions below their pivots arranged to engage against one of the abutment portions of the said members when the handle is in active position and to rest at their portions above their pivots upon the other abutment portion of said members when the handle is in folded position.

12. In a convertible child's vehicle, a body supported for travel, members mounted upon the opposite sides of the body and each having a boss provided with relatively angularly disposed abutment portions, a handle for propelling the vehicle including side members pivotally connected to the last mentioned members and having their portions below their pivots arranged to engage against one of the abutment portions of the said members when the handle is in active position and to rest at their portions above their pivots upon the other abutment portion of said members when the handle is in folded position, and coacting latch means upon said members and the side members of the handle for retaining the handle in active position.

13. In a convertible child's vehicle, a body supported for travel, members mounted upon the opposite sides of the body and each having a boss provided with relatively angularly disposed abutment portions, a handle for propelling the vehicle including side members pivotally connected to the last mentioned members and having their portions below their pivots arranged to engage against one of the abutment portions of the said members when the handle is in active position and to rest at their portions above their pivots upon the other abutment portion of said members when the handle is in folded position, eye members carried by the side members of the handle, and braces pivoted at the opposite sides of the body and having hooked portions engageable with the eye members whereby to brace the handle in active position.

14. In a convertible child's vehicle, a body supported for travel, a back rest foldable to position upon the bottom of the body, a top foldable with relation to the back rest to overlie the same in the folded position of the said back rest, the supporting means for the top comprising arms pivotally connected with the opposite sides of the back rest and with the said top, and braces extending between the top and the arms and when in active position constituting means for bracing the top in active position and when rendered inactive to permit of pivotal movement of the top with relation to the arms.

In testimony whereof we affix our signatures.

JOHN J. ABRAHAMS. [L. S.]
GERDINA KROKKEE ABRAHAMS. [L. S.]